May 22, 1928.
O. S. BEYER
1,670,648
AUTOMATIC PUNCHING PRESS
Filed Aug. 19, 1925          5 Sheets-Sheet 2
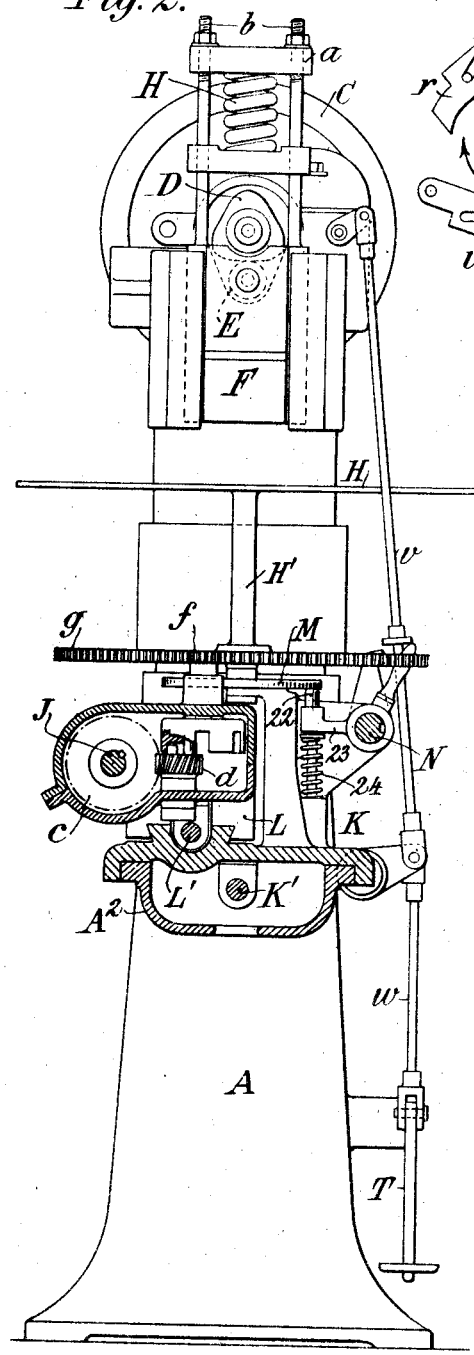
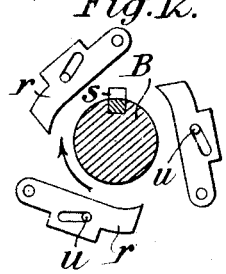
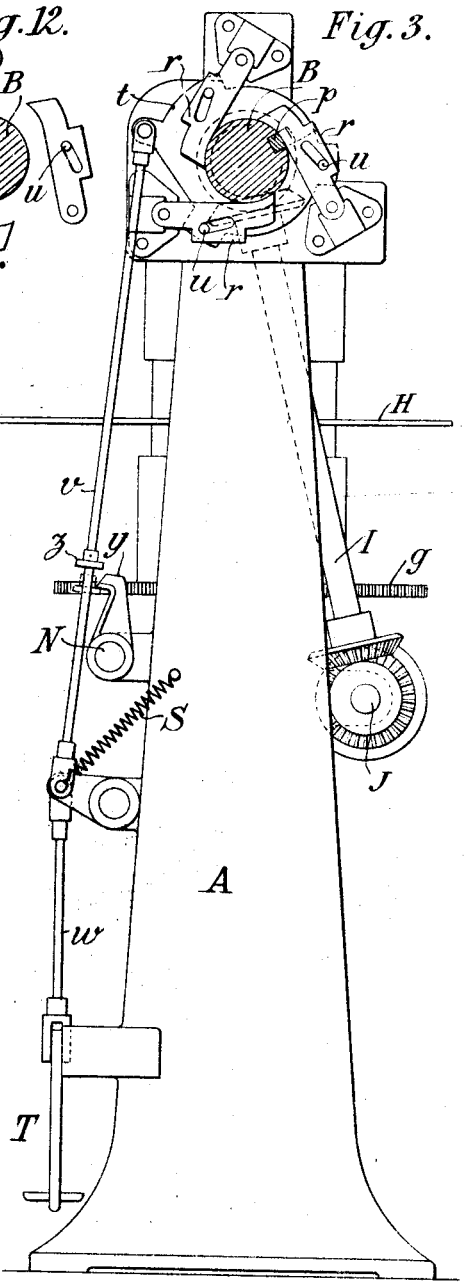
INVENTOR :
Otto S. Beyer,
By Attorneys,
Fraser, Myers & Manley May 22, 1928.
O. S. BEYER
1,670,648
AUTOMATIC PUNCHING PRESS
Filed Aug. 19, 1925
5 Sheets-Sheet 3
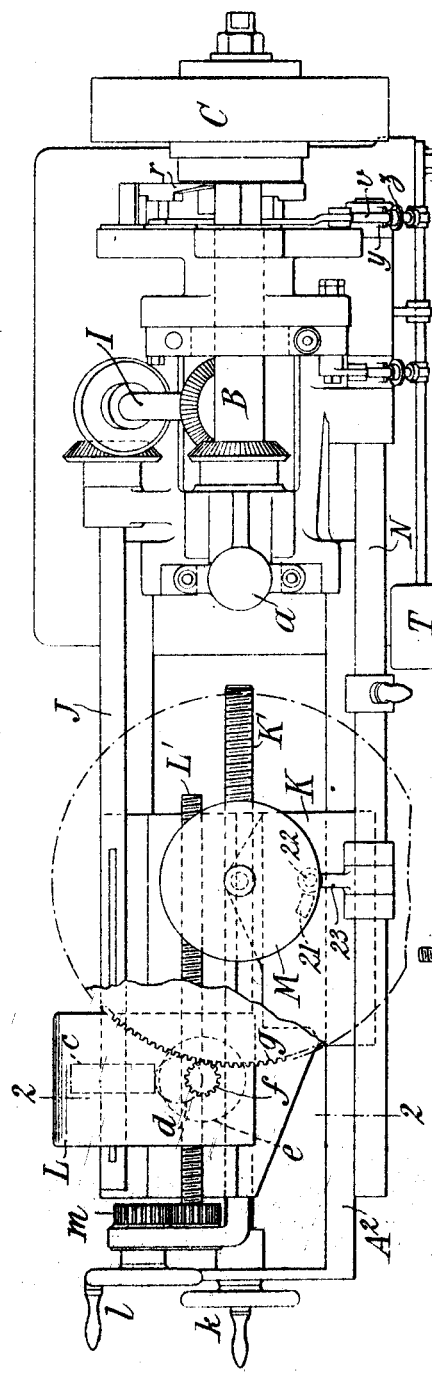
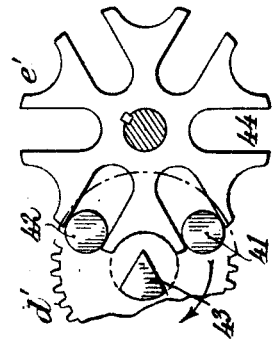
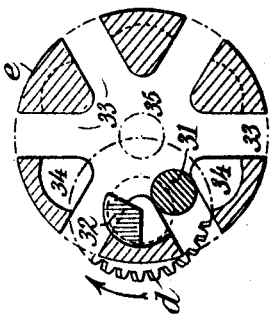
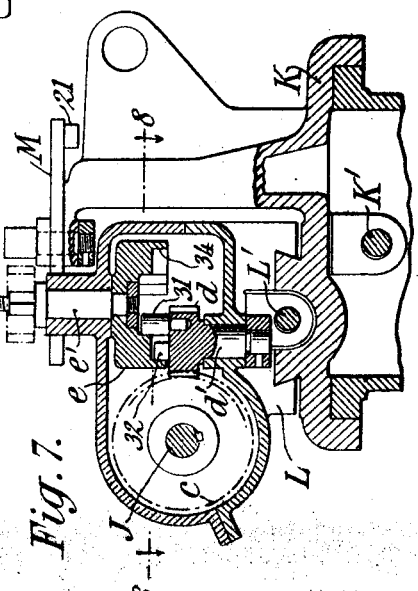
INVENTOR
Otto S. Beyer,
By Attorneys,
Fraser, Myers & Manley

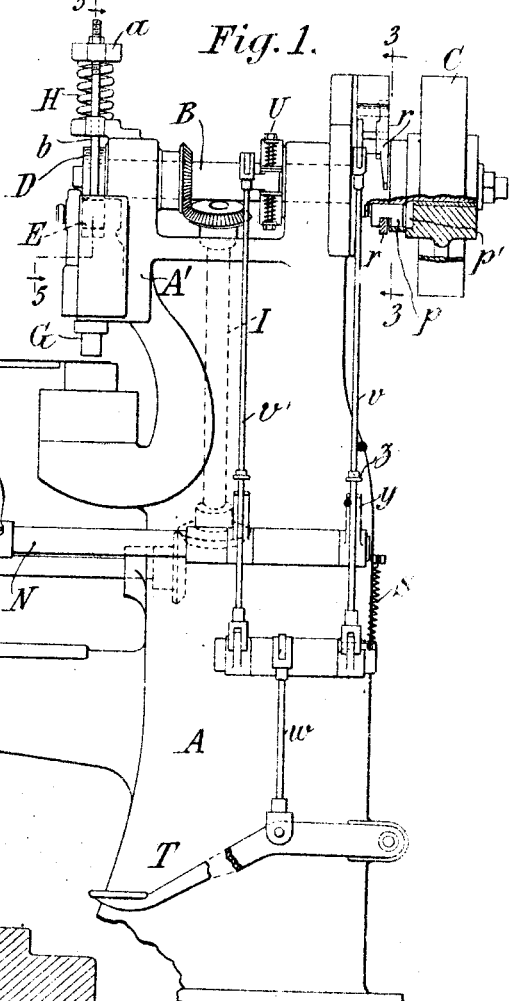

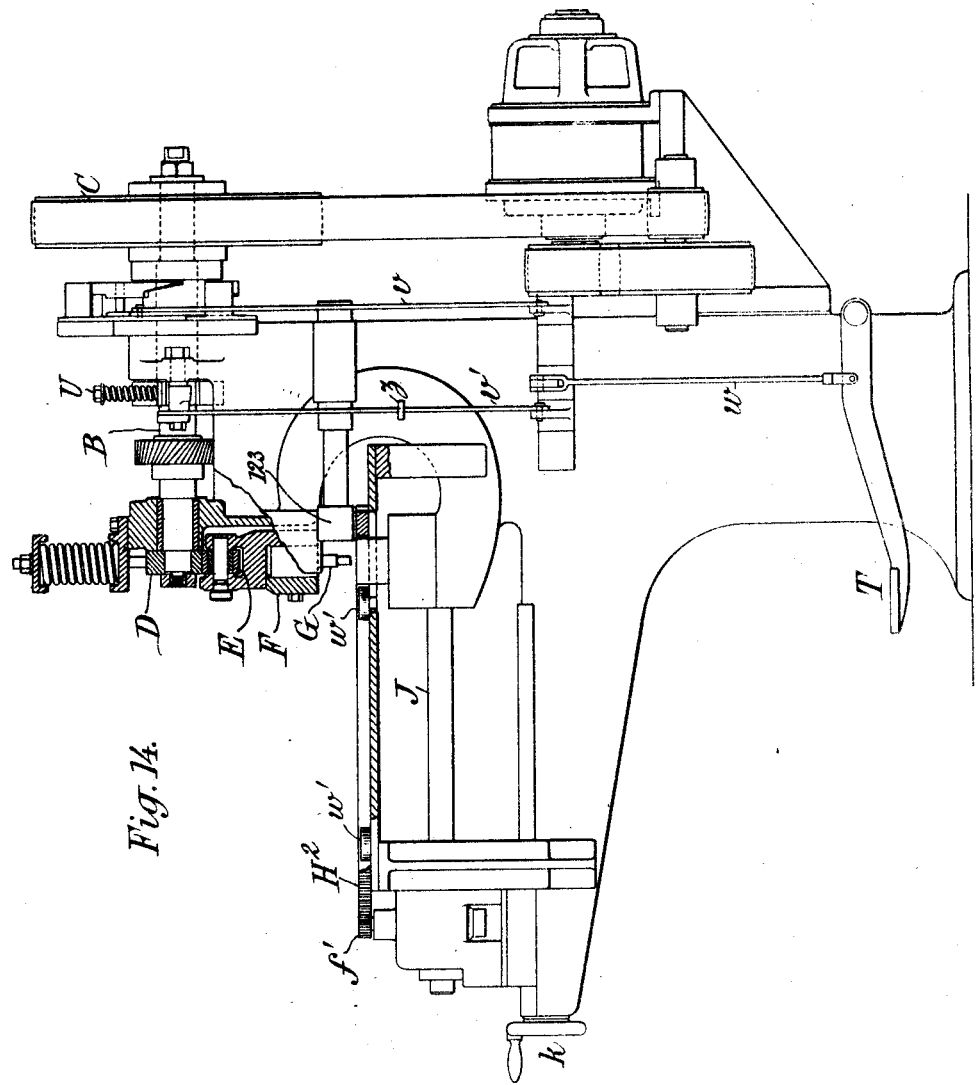

May 22, 1928.

O. S. BEYER 1,670,648

AUTOMATIC PUNCHING PRESS

Filed Aug. 19, 1925    5 Sheets-Sheet 5

INVENTOR
Otto S. Beyer,
By Attorneys,
Fraser, Myers & Manley

Patented May 22, 1928.

1,670,648

UNITED STATES PATENT OFFICE.

OTTO S. BEYER, OF BROOKLYN, NEW YORK, ASSIGNOR, BY MESNE ASSIGNMENTS, TO E. W. BLISS COMPANY, OF BROOKLYN, NEW YORK, A CORPORATION OF DELAWARE.

AUTOMATIC PUNCHING PRESS.

Application filed August 19, 1925. Serial No. 51,169.

This invention relates to presses for punching a circular series of holes or slots in a plate. Such punched plates are commonly the laminated cores of the armatures or field magnets of dynamo-electric machines. The laminæ for such cores require to be punched with great accuracy, so that when superposed their holes or slots will precisely coincide. Two ways of punching such laminæ have been practiced: (1) According to the first method, a pair of multiple dies is made for the simultaneous punching at one stroke of all the holes or slots of the circular series required to make the complete punching; but especially in the case of laminæ having numerous holes or slots, such dies are extremely expensive, so that this method is usually prohibitive in cost. (2) The second method is to provide a single pair of dies adapted for punching one hole or slot at a time, and to provide the punching press with an automatic feed whereby the work carrier is turned step by step after each punching until the entire circular series (or fraction thereof) is completed, whereupon the automatic feed stops the machine and the operator takes out the work. It is to the latter class that the present invention pertains.

The punching of core laminæ in this manner is comparatively slow, especially in the case of those having numerous holes or slots to the complete circumference, since usually even the most rapid of such machines cannot be speeded up above 200 strokes per minute. It results that the cost of production in this way is much greater than the cost by the first method after the first cost of the multiple dies has been met. Consequently, when the laminæ are to be produced in great quantities, it is more economical to incur the heavy expense for such dies, so that the complete lamina may be struck out at one stroke. The present invention aims to provide an automatic press with a single punch and die which would be capable of operating at such speed as to produce the punched sheets or laminæ with a rapidity comparable to that obtained with the complete pair of dies.

Every such press requires, when manually started, to operate through a given cycle or succession of punching strokes until the work is completed, and then to automatically stop with great precision. To accomplish this requires that its main shaft be driven from a suitable driving member through a positively acting clutch, so as to insure that the stopping of the machine shall occur with great precision upon the completion of the series of punchings, and with the punch elevated and the automatic feed at rest. It has been found in practice that such clutches cannot be controlled at a higher shaft speed than about 200 R. P. M. It follows that with presses as ordinarily constructed the extreme punching speed is approximately 200 strokes per minute.

The present invention seeks to multiply the product of such presses by multiplying the punching speed above the limiting speed of clutch control. Assuming that such limiting speed is 200 R. P. M., the present invention results in doubling or preferably trebling that speed so as to give the punch approximately 400 or 600 strokes per minute. This is accomplished by driving the shaft at a speed close to the limit of such clutch control, and driving a punch therefrom through accelerating means such as a multiple cam or equivalently by being geared up to a crank or eccentric driving the punch.

The invention further provides means for imparting an accelerated feed, so that the feeding of the sheet or plate is speeded up to the same extent as the punching operation. To this end the carrier for the work is given a rapid succession of forward feeding movements which are multiplied beyond the speed of the main or driving shaft in the same ratio as the multiplication of the punch movements.

To attain movements at such high speeds, provision is made for eliminating as far as possible all reciprocating movements and utilizing rotary movements to the utmost extent. In practice the machine embodying this invention has no reciprocating parts which come into function in the operation of punching the work, except the head carrying the punch itself. It is not considered feasible to operate a punch otherwise than by a rectilinear movement, and for this reason a reciprocating punching head is required; but it is made of the minimum mass consistent with strength, so as to be capable of extremely rapid reciprocation. All other parts of the machine have solely rotary movements, and all except the work carrier have continuous rotation at uniform speed.

The work carrier necessarily comes to a complete rest before each punching stroke, its feeding movement including a gradual acceleration to the maximum, and then an equally gradual retardation ending in the next succeeding dwell.

The invention further provides an improved type of feeding mechanism for accomplishing these desirable movements of the work carrier. This feeding mechanism is of the Geneva cross type, its driving and driven members being in constant engagement so as to afford a positive motion.

As the feed movement requires more time than the punching, it is desirable to provide that the punch, which has a short stroke, shall be in engagement with the plate being punched for not over about one-third of the total time for each punching stroke, thereby leaving approximately two-thirds of such time for the feeding of the work into position for the next stroke. During this feeding period the punch is ascending above the work to a convenient distance, and descending into contact with the work to be punched at the next stroke.

Having now indicated the general nature of the invention and of the automatic punching machine embodying it, I will proceed to describe in detail the preferred embodiments of the invention with reference to the accompanying drawings, wherein—

Fig. 1 is a side elevation of the machine.

Fig. 2 is a front elevation thereof partly in vertical section, on the line 2—2 in Fig. 4.

Fig. 3 is a rear elevation, the main shaft being in section on the line 3—3 in Fig. 1.

Fig. 4 is a plan of the machine, the work carrier being removed and its driving gear being partly broken away.

Figs. 5 and 6 are enlarged details of the punch driving means, Fig. 5 being a transverse section in the plane of the line 5—5 in Fig. 1, and Fig. 6 a longitudinal section in the plane of the line 6—6 in Fig. 5.

Fig. 7 is a transverse section on the same plane as Fig. 2, but on a larger scale.

Fig. 8 is a horizontal section on the line 8—8 in Fig. 7, showing the Geneva cross feed driving device.

Fig. 9 is a similar view showing another construction of the feed driving movement.

Fig. 10 is a fragmentary elevation on a larger scale, of the clutch element shown in section at the right in Fig. 1.

Fig. 11 is a view from underneath in Fig. 10, of the clutch bolt $s$ and unlocking dog $r$.

Fig. 12 is a transverse section of the driving shaft, showing the clutch dogs out of action and the clutch bolt engaged.

Fig. 13 is a plan showing two different types of punchings such as this press is capable of producing, having respectively internal and external notchings.

Fig. 14 is a side elevation corresponding to Fig. 1, showing a somewhat different construction of press, certain parts being in vertical mid-section.

Figure 15:
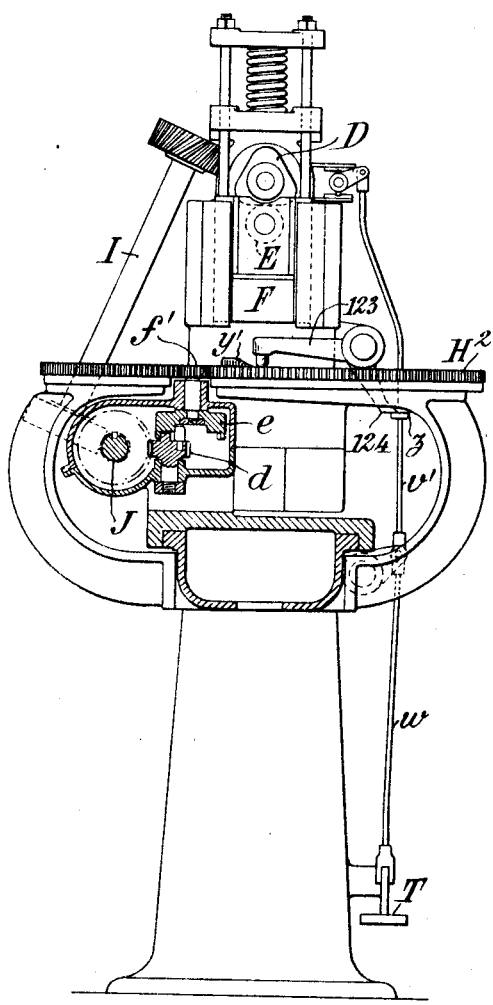

Fig. 15 is a front elevation of the press shown in Fig. 14, the view corresponding to Fig. 2, and certain portions being in vertical section in the same plane as in Fig. 2.

Figure 16:
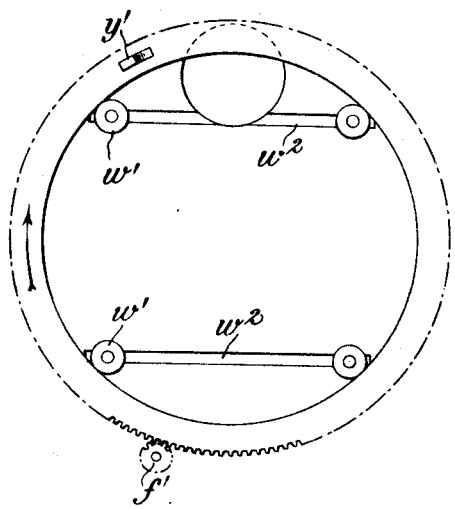

Fig. 16 is a plan of the feed table of Figs. 14 and 15 showing its mounting.

Referring first to the embodiment shown in Figs. 1 to 12, the general construction of the machine, so far as concerns its framework and driving means, and the means for starting and stopping the feed, is in general similar to that common with other such machines. The frame A of the machine constitutes a pillar rising from the base, supporting the punching head A' and having at a convenient level a horizontal projection A² for carrying the feeding means. The upper part of the frame provides bearings for the main shaft B which is driven from a driving wheel C which may be a belt pulley or any other rotary member suitably driven from the motor means, which may be an electric motor, as shown in Fig. 14. It will in this description be assumed that the shaft B turns at 200 R. P. M., and that the punching rate is trebled, giving 600 punching strokes per minute. The shaft B carries on its front end a cam D having a working face of the shape shown in Fig. 5, so as to force downward the roller E three times to each revolution. The roller E is carried by the punch slide F, which in any usual way carries the punch G. The punch slide is lifted by a spring H seated on the top of the frame and pressing upwardly against a cross-head $a$ which through tie-rods $b$ $b$ connects to the slide. The cam is conformed to give an easy rising and falling movement similar to that which would be imparted by a crank geared up to three times the speed of the shaft B. The spring has such stiffness and resiliency that it lifts the punch slide quickly after each depression and keeps the roller E always in firm contact with the cam D. By this means the punch is given three strokes to each turn of the main shaft B. The mass of the reciprocating parts is kept down to the minimum consistent with adequate strength, so that the punch can reciprocate with great rapidity.

The plate or lamina to be punched, indicated at $x$, is carried on a work carrier or turntable H of any usual or suitable construction, and which is shown in Fig. 1 as consisting of a disk having any ordinary means for fastening the work to it. It is mounted on a central shaft H' and is rotated intermittently by the feed mechanism which will now be described.

This feed mechanism is driven in any suitable way from the source of power, and preferably from the main shaft B, so as to be timed in perfect synchronism with the punch. In the construction shown, the shaft B drives through bevel gears the shaft I which extends down to and drives through bevel gears a shaft J, the latter extending horizontally and parallel to the shaft B, and having bearings in the frame extension A². The shaft J may turn at the same speed as the shaft B, although it is preferable to speed it up somewhat through the intermediate bevel gears. The shaft J carries a gear c which may be a screw or worm gear, and which meshes with and drives a pinion d (see Fig. 7) which is shown as turning on a vertical axis, and which in turn through a cam action drives an intermittent rotor e. The gearing ratios are such that the pinion d makes one turn to each punch stroke and each feed movement, which in the example assumed is 600 R. P. M. The rotor c is fixed on a spindle e' on the upper end of which is detachably fitted a driving pinion f which meshes with and drives a large gear g which is detachably fastened to the shaft H' and drives the carrier or turntable H. The cam driving connection between the pinion d and rotor e is such that to each rotation of the pinion the rotor is turned during approximately two-thirds of the time and held stationary during the remaining time. The rotor may be variously proportioned so as to be turned a given fraction of its revolution to each rotation of the pinion; in the construction shown, which will be described hereinafter, it is given one-sixth of a turn to each turn of the pinion. The parts are so co-related to the punch drive that the punch enters the metal plate and rises out of it during approximately one-third of the time while the rotor e and turntable H are stationary; and while the punch is up clear of the work the rotor is given its next forward movement, which advances the turntable far enough enough to feed the work the required distance for the next punching. The precise extent of feed is determined by the ratio between the pinion f and gear g; and as these are removable and may be replaced by others of different ratio, the extent of feed may be varied for each different kind of work to be punched, without other alteration of the machine than the substitution of these gears.

Inasmuch as such change in gear ratio will commonly require setting the axes of the spindle e' and the turntable H at different distances apart, and as the punching of different diameters of work requires setting the axis of the turntable at varying distances from the punch axis; it becomes necessary to provide for adjusting these relative dimensions. To this end the frame extension A² is formed as a slideway on which are mounted slides K and L, the former carrying the axial mounting of the turntable and the latter the bearing for the spindle c'. As a matter of construction it is preferable to mount the slide K to slide on the frame extension and to provide it on its upper side with a slideway on which the slide L moves. The slide K is moved by an adjusting screw K', and the slide L is moved by an adjusting screw L', the former being turned directly by a hand wheel and crank k, and the latter by a hand wheel and crank l, through intermediate pinions m shown in Fig. 4. The slide L carries not only the bearing for the spindle e', but also the bearing for the journal d' of the pinion d, and also engages and locates the screw gear c which is splined upon the shaft J so as to slide upon it as the slide L is moved. The slide L is constructed as a hollow chamber enclosing the gears c, d, and rotor e, and forming a lubricating box therefor.

The means for starting and stopping the machine will now be described. This consists of an ordinary and well-known form of positively-acting clutch or coupling which may be substituted by any other known construction which will accomplish the same result. Since with the described proportions the machine makes three effective strokes to each turn of the main shaft, it is necessary that the driving clutch be constructed to stop the main shaft at any third of a turn (instead of at the end of a complete turn, as is usual in clutch-driven presses). Aside from this feature the construction of the clutch is not changed as compared with any suitable type of positive lock clutch. Well known clutches of this type are the "Bliss-consolidated" and the "Johnson" clutch. The particular clutch shown in the drawings is of the Johnson type. The hub of the driving pulley C turns freely on the main shaft B until locked to it by the clutch. The locking member is a bolt p seated in a collar or flange on the shaft B and impelled outwardly by a spring q to cause its end to enter a recess p' in the hub C. When at rest the bolt p is held back by any one of three stop levers r, each of which has a tapering end, as shown in Fig. 11, and enters a notch in the bolt behind a stud s, a stop shoulder r' on the stop lever r abutting against this part of the bolt to stop the shaft at a precise point. To start the press the three stop levers are thrown outward to the position shown in Fig. 12, whereby the one lever holding the bolt releases it and the bolt is pressed outwardly and enters the recess p' on the revolving hub when the latter arrives in coincidence with the bolt. The machine is thus started with precision at this exact point. When the required number of punch strokes have been performed, the machine is stopped by simultaneously throwing inward the three stop levers r, whereupon the one which is first encountered by the bolt p is engaged by the projecting lug s thereon, so that the inclined end portion of the stop lever pushes back this lug and thereby withdraws the bolt, and upon the lug striking the face r' the shaft is stopped with precision. The three stop levers r are located at circumferential distances 120° apart, so that they respectively stop the shaft at equal thirds of a complete revolution. For operating the stop levers r an oscillatory collar t is provided having any suitable operative engagement with the stop levers, as by pins u engaging oblique slots in the levers, so that the turning of the collar t in one direction throws the levers simultaneously inward, and its turning in the other direction throws them outward. The collar t is operated by rods v, w extending to a treadle lever T in a well known manner, so that by depressing the treadle the rods are pulled and the collar is turned to throw out the rocking levers and thereby start the press. A spring S is suitably located to throw back the collar to the clutch releasing position; this is prevented by a spring-pressed catch hook y engaging a collar z on the rod v (or other suitable stop), so that the stop levers are held inactive while the press is running through the prescribed punching cycle.

It is necessary to stop the press automatically at the precise point in the rotation of the turntable when the last punching has been made to complete the circular series of punchings required for the work. For this purpose an adjustable cam device is provided which acts to withdraw the hook y and permit the spring S to throw the three stop levers inwardly so as to withdraw and arrest the bolt at the coinciding third of a turn of the shaft. For this purpose a stop cam disk M is provided, attached in adjustable fixed relation to the turntable H and gear g (see Fig. 1). This carries a tooth 21 which in its rotation encounters a pin 22 or other projection on an arm 23 which is pressed up by a spring 24. The arm 23 has a splined connection with a shaft N which extends parallel with the movement of the slides and carries the hook y. The pressing down of the pin 22 by the cam tooth 21 rocks the shaft N and withdraws the hook y so as to free the rod v and permit the collar t to turn and throw the stop levers r inwardly. By precisely adjusting the disk M to the proper position with respect to the turntable, it acts to thus stop the press at the instant when the last punching stroke has been performed.

Such stoppage of the machine must occur when the punch is elevated out of the work. It should occur when the punch stops at the upper end of its stroke in order to avoid the jar of stopping the punch (which is the only reciprocating part of any weight) during its stroke. This, however, involves stopping the feed at mid-movement. A compromise may be made by stopping the punch on its up-stroke just as it clears the work and before the movement of the turntable begins.

The improved Geneva stop movement or device for giving the described feed motions will now be explained.

Referring particularly to Figs. 7 and 8, the rotor d carries an eccentrically-mounted pin or crank stud 31, and is formed with a concentric sector 32 which is cut away on the side toward the stud. The driven rotor e is formed with a series of radial grooves or slots 33, shown in Fig. 8 as being six in number; it is also formed between these with recesses 34 having arc-shaped faces of like radius to the sector 32. The central portion of the rotor e is so far cut away that the stud 31 in its rotation may swing from one radial slot 33 to the next; in Fig. 8 the entire central portion is cut away, forming a chamber 35. In Fig. 8, where the rotor d is turning in the direction of the arrow, its stud 31 is just entering one of the radial slots 33, and its sector 32 is beginning to pass out of engagement with the corresponding concave wall of the arc-shaped recess; from this point the stud in its orbital movement carries the driven rotor with it by its engagement with the walls of the slot 33; this movement begins imperceptibly and gradually increases in velocity until the stud is at its point of greatest distance from the axis of the driven rotor, and from this point the movement imparted to the latter gradually slows down until it stops just as the stud is emerging from the radial slot in its next position. During this movement the sector 32 is swinging into the central chamber 35 and passes out of engagement with the recess 34 which it has been engaging and enters into engagement with the next recess 34, so that upon the completion of the movement it has so far engaged the latter as to hold the driven rotor stationary, and it continues so to hold it while the stud is swinging from the slot 33 it has just left, to the next slot 33. This device is very simple and operates with great accuracy, and imparts an ideal movement to the work carrier or holder H through the intermediate gearing; that is to say, the carrier starts very slowly from its position of rest, gradually accelerates to the middle of its movement, and then gradually retards until it finally comes to rest again; and these movements occupy approximately two-thirds of one rotation of the driving rotor, the remaining third, while the stud 31 is out of action, being the rest period of the driven rotor, while the sector 32 is engaging the arc face of one of its recesses 34.

The modified construction shown in Fig.

9 has a somewhat different movement. The driving rotor d' has two studs 41 and 42, and a sector 43; the driven rotor e' has radial slots 44 corresponding to the slots 33 in Fig. 8, but closed inwardly and opening outwardly. The operation is the same as that of an ordinary Geneva stop movement, except that because of the duplication of the studs 41, 42, each feed consists of a double movement; each movement turns the rotor e' one-sixth of a turn, and the two movements turn it one-third of a turn, which, being reduced by the gearing f, g, imparts the correct angular feed to the blank carrier. An advantage of this construction is that the carrier comes to rest at the middle of the feeding movement, which coincides with the topmost position of the punch slide; so that by stopping the machine at the end of the cycle of punchings at this instant it is stopped while both the principal moving parts are at rest.

It will be understood by those skilled in the art that the machine may be variously modified according to the particular result in any case to be attained. It is assumed that the blank carrier has some suitable means for clamping the blank to it. These means will vary according to whether the blank is a disk or ring, and according to whether the punchings are at the outer part or inner part. Fig. 13 shows two examples of the punching or lamina x, the one on the left being a ring punched on its inner margin, and the one on the right being a disk punched on its outer margin. Numerous other kinds of punching may be made, according to circumstances. The blank carrier of course will have any suitable means for clamping the blank to it, but such means, being well known in the art, are not illustrated.

The work carrier shown in Fig. 1 is adapted for the exterior punching of a disk or ring. For interior punching of a ring a somewhat different design of machine is required, an example of which is shown in Fig. 14, which is a view corresponding generally to Fig. 1. The mechanism here shown is essentially the same as that already described, except that the feed motion is communicated through skew gearing instead of bevel gearing. The blank carrier H² is a ring centered by rollers w' and having exterior gear teeth driven by a pinion f' which corresponds to the pinion f in Fig. 1. This construction permits the punch to descend inside of the blank carrier H², as shown. The mechanism illustrated in Fig. 15 requires no special description, except to state that the automatic stop means is actuated by a cam or button y' mounted adjustably on the blank carrier H² and operating to lift the lever 123, the arm 124 of which takes the place of the hook y in the previous construction, and by this movement is pulled out of engagement with the collar z on the rod v' for stopping the machine. To adapt the machine to annular blankholders H² of varying internal radii, the rollers w' are made adjustable in tangential or other suitable slots w², as shown in Fig. 16.

In both constructions the treadle T connects through rod w with two rods v and v', the former operating the clutch as already described, and the latter operating in usual manner the brake U for stopping the driving shaft without shock just as the clutch is released.

It will be understood that the details of the mechanism may be greatly varied without departing from the underlying principles inherent in this invention.

The invention is not limited to punching a circular disk or ring, nor to punching entirely around a circle, as the punching may be done upon an arc-shaped blank or blank of other form, and for any required number of punch strokes.

What I claim is:—

1. A punching press having a positive clutch drive comprising a main shaft, a positive clutch having a plurality of release stops spaced apart at equal angular intervals, means for driving the shaft through said clutch, whereby the shaft may be driven at a speed within the limiting speed of clutch control, a punch, and a speed-multiplying punch-driving transmission adapted to positive impel the punch during each punching stroke, said transmission multiplying the punch speed by a ratio equal to the number of clutch release stops, whereby the shaft may be driven at a speed within the limiting speed of clutch control, while the punch is accelerated to a multiple of such speed, and the press may be stopped after any punching stroke.

2. A punching press according to claim 1, the punch driving transmission comprising a cam having a plurality of projections for positively forcing the punch downward with a frequency exceeding the speed of the main shaft.

3. In a punching press according to claim 1, a mechanism for imparting a step-by-step feed motion synchronized with the punch movements, having an accelerating and retarding feed movement adapted to impart a dwell to the blank being fed, whereby to hold the blank stationary while the punch is engaging the blank.

4. In a punching press having a main shaft and a punch with multiplying transmission for giving a plurality of punch strokes to each turn of said shaft, a mechanism for imparting a step-by-step feed motion comprising a driving rotor making one turn to each punching stroke and a driven rotor making a fractional part of a turn to each punching stroke, and adapted to impart to the blank an accelerating and retarding feed movement and a dwell holding the blank stationary while the punch is engaging the blank.

5. In a punching press having driving means, a punch, and a mechanism for imparting a step-by-step feed motion comprising a driving member, and a Geneva cross stop device adapted to impart to the blank a gradual acceleration and retardation, adapted to accomplish a complete feeding movement in approximately two-thirds of the rotation of the driving member, and dwelling during the remaining third to permit the punch to enter and clear the blank.

6. A punching press including a driving shaft, a reciprocating punch, multiplying means for driving the punch at a higher speed than the shaft, a blank-carrier, with a mechanism for imparting a step-by-step feed motion to said carrier comprising a driving rotor having a geared-up connection with the driving shaft and making one turn to each punching movement, and a driven rotor geared to the blank-carrier to advance the latter one space between punchings to each punching movement, said driving rotor having a cam-stud and stop-sector, and said driven rotor having radial slots engaged successively by said stud to impart such feeding movements, and arcs engaged by said sector to hold it stationary between the feeding movements.

7. A press according to claim 6, the feed motion proportioned to advance the blank carrier during more than a half turn of its driving rotor and to hold the blank carrier stationary for the punching stroke during less than a half turn of such driving rotor.

8. A step-by-step feed motion comprising a Geneva cross stop device with a driving rotor making one turn to each complete feeding movement, said driving rotor having a cam stud and a stop sector, a driven rotor having radial slots engaged successively by said stud, and an inner space wherein the stud may freely pass from one slot to another while the driven rotor is at rest, and reciprocal means for holding the driven rotor stationary between the feeding movements, and a blank carrier geared to and driven by the driven rotor.

9. A feed motion according to claim 6, the driving rotor having a cam stud and a stop sector, and the driven rotor having radial slots engaged by said stud, and internal arcs engaged by said sector, the axis of the driving rotor being within the radius of the driven rotor, and the latter having a space within the slots wherein the stud may turn freely while the driven rotor is held at rest.

10. A high-speed punching press having a positive clutch drive, a main shaft adapted to be driven at a speed approximating the limiting speed of clutch control, with multiplying means for driving the punch therefrom at higher velocity, a feed-mechanism for feeding the blank, and multiplying gearing driving such feed-mechanism in synchronism with the punch movements.

11. A high speed punching press having a positive clutch drive and a main shaft adapted to be driven at a speed approximating the limiting speed of clutch control, multiplying means for driving the punch at a speed which is a multiple of the driving shaft speed, and multiple means for disengaging the clutch and stopping the shaft operable after any punching stroke.

12. A press according to claim 10, having means for unclutching and stopping the main shaft after any punch stroke, and automatic means in connection with the feed motion for determining such stoppage at the end of a prescribed cycle of punching.

13. A high speed punching press having multiplying means between the main shaft and the punch for imparting to the punch multiple punching strokes to each turn of the shaft, a positive motion clutch for driving said shaft, and multiple means for disengaging said clutch and stopping the shaft, adapted to stop the shaft after any punching stroke.

14. In a high speed punching press, a main shaft, a punch and intervening mechanism for imparting to the punch three punching strokes to each turn of the shaft, a positive motion clutch for driving said shaft, and triple releasing means for said clutch operable to disengage the clutch after any punching stroke.

15. A high speed punching press comprising a main shaft, multiplying means for driving the punch therefrom, a positive drive clutch, multiple clutch-releasing means adapted to disengage the clutch after any punching stroke, and automatic means for simultaneously operating said clutch-releasing means whereby when they are brought into engagement the one nearest in the path of the clutch acts to stop the machine.

In witness whereof, I have hereunto signed my name.

OTTO S. BEYER.